United States Patent
Li et al.

(10) Patent No.: US 9,563,011 B2
(45) Date of Patent: Feb. 7, 2017

(54) OPTICAL TRANSMISSION USING FEW-MODE FIBERS

(75) Inventors: Guifang Li, Oviedo, FL (US); Fatih Yaman, Orlando, FL (US); Xiaobo Xie, Orlando, FL (US); Likai Zhu, Orlando, FL (US); Neng Bai, Orlando, FL (US); Cen Xia, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 144 days.

(21) Appl. No.: 13/695,864

(22) PCT Filed: Jan. 27, 2011

(86) PCT No.: PCT/US2011/022711
§ 371 (c)(1),
(2), (4) Date: Nov. 2, 2012

(87) PCT Pub. No.: WO2011/094400
PCT Pub. Date: Aug. 4, 2011

(65) Prior Publication Data
US 2013/0064554 A1   Mar. 14, 2013

Related U.S. Application Data

(60) Provisional application No. 61/298,728, filed on Jan. 27, 2010.

(51) Int. Cl.
*H04L 9/32* (2006.01)
*G02B 6/02* (2006.01)
*G02B 6/028* (2006.01)
*G02B 6/036* (2006.01)

(52) U.S. Cl.
CPC ......... *G02B 6/02009* (2013.01); *G02B 6/028* (2013.01); *G02B 6/02042* (2013.01); *G02B 6/02347* (2013.01); *G02B 6/03627* (2013.01)

(58) Field of Classification Search
CPC combination set(s) only.
See application file for complete search history.

(56) References Cited

U.S. PATENT DOCUMENTS

| | | | |
|---|---|---|---|
| 4,915,468 A | 4/1990 | Kim | |
| 5,818,630 A * | 10/1998 | Fermann et al. | 359/341.31 |
| 6,418,256 B1 * | 7/2002 | Danziger et al. | 385/123 |
| 8,218,928 B2 * | 7/2012 | Jasapara | 385/124 |
| 2008/0192333 A1 * | 8/2008 | Bolshtyansky et al. | 359/334 |
| 2009/0245295 A1 * | 10/2009 | Ishaaya et al. | 372/18 |
| 2010/0329670 A1 * | 12/2010 | Essiambre et al. | 398/43 |
| 2011/0013268 A1 * | 1/2011 | Shaw et al. | 359/341.1 |
| 2011/0150061 A1 * | 6/2011 | Winzer | 375/224 |

(Continued)

OTHER PUBLICATIONS

All-fiber spectral filters based on LP01-Lp11 mode coupling and applications in WDM and dispersion compensation by Jyothikumar et al, Jun. 1996.*

(Continued)

*Primary Examiner* — Shi K Li
*Assistant Examiner* — Mina Shalaby
(74) *Attorney, Agent, or Firm* — William Greener; Bond, Schoeneck & King, PLLC (57) ABSTRACT

In some embodiments, an optical transmission system includes a few-mode fiber that supports at least 2 spatial modes but no more than 50 spatial modes.

20 Claims, 7 Drawing Sheets

(56) References Cited

U.S. PATENT DOCUMENTS

2011/0243574 A1* 10/2011 Essiambre et al. ........... 398/200
2012/0099609 A1* 4/2012 Dong et al. ....................... 372/6
2012/0219026 A1* 8/2012 Saracco et al. ................. 372/21

OTHER PUBLICATIONS

Sim et al., High-Speed Multimode Fiber Transmission by Using Mode-Field Matched Center-Launching Technique, Journal of Lightwave Technology, vol. 27, No. 8, Apr. 15, 2009.*
International Search Report and Written Opinion, dated Sep. 30, 2011.

* cited by examiner

OPTICAL TRANSMISSION USING FEW-MODE FIBERS

CROSS-REFERENCE TO RELATED APPLICATION

This application is the 35 U.S.C. §371 national stage of, and claims priority to and the benefit of, PCT application PCT/US2011/022711, filed Jan. 27, 2011, which claims priority to and the benefit of U.S. Provisional Application No. 61/298,728, filed on Jan. 27, 2010, herein incorporated by reference in its entirety.

BACKGROUND

Optical fiber is a common transmission medium for telecommunications. It is especially advantageous for long distance communications because light propagates through the fiber with little attenuation as compared to electrical cables and because higher data rates are possible.

In most long distance communication scenarios, single-mode fiber is used. Single-mode fiber typically has a core diameter in the range of approximately 8-10 microns ($\mu m$) and can only support a single spatial mode, or pathway, for light signals. Although multi-mode fibers can support more modes (typically 100-200 modes) and therefore could be used to transmit more data, multi-mode fiber suffers from distortion issues, such as modal dispersion, which become particularly problematic over longer distances.

Despite providing advantages over multi-mode fibers in long distance communication scenarios, single-mode fibers suffer from nonlinearity problems, such as self-phase modulation (SPM), cross-phase modulation (XPM), and four-wave mixing (FWM). Those phenomena are major limitations on fiber transmission capacity. Significant efforts have been made to reduce, mitigate, or remove nonlinear penalties. Such efforts include using dispersion maps, using more nonlinearity-tolerant modulation formats such as differential phase-shift keying (DPSK), using amplification schemes such as Raman amplification, designing fibers with larger effective area, and compensating nonlinear impairments using digital signal processing (DSP) techniques. Unfortunately, all of those methods are limited in the extent to which they can reduce the nonlinear impairments.

In view of the nonlinearity issues associated with single-mode fibers and the difficulty in compensating for them, it can be appreciated that it would be desirable to have alternative means for optically transmitting information, particularly across long distances.

BRIEF DESCRIPTION OF THE DRAWINGS

The disclosed embodiments can be better understood with reference to the following figures. It is noted that the components illustrated in the figures are not necessarily drawn to scale.

DETAILED DESCRIPTION

As described above, single-mode fibers are normally used in long distance optical communications because they do not suffer from distortion issues as do multi-mode fibers. However, single-mode fibers suffer from nonlinearity problems, which are major limitations on fiber transmission capacity. As described herein, advantageous results can be obtained when optical fibers that support more than one spatial mode but fewer spatial modes than the multi-mode fibers that are currently in use are used as a transmission medium in a transmission system or communication link. Such fibers are referred to herein as "few-mode" optical fibers and, in some embodiments, support approximately 2 to 50 modes. Few-mode fibers do not have the same issues with nonlinearity as do single-mode fibers and can be configured so as to not have the modal dispersion problems that are common to multi-mode fiber. In some embodiments, few-mode fibers are used in lieu of single-mode fibers in long distance communications links. In other embodiments, few-mode fibers are used in conjunction with single-mode fibers in such communication links.

In this disclosure, particular embodiments are described and illustrated. It is noted that those embodiments are mere examples and that many other variations are possible. The scope of the present disclosure is intended to include all such variations.

The demand for higher bandwidth in long-haul optical transmission systems is increasing at a rate greater than the rate of technological advances. Fiber capacity can be increased by reducing the fiber loss or increasing the optical signal-to-noise ratio, reducing the channel spacing, increasing the low loss window to fit more wave division multiplexing (WDM) channels, or making better use of the existing window by employing higher order modulation formats. Each of these choices faces several technical issues, and a common underlying limitation is fiber nonlinearity. Therefore, it is clear that reducing the fiber nonlinearity would enable increasing the fiber capacity in several dimensions depending on which methods are more technically viable.

As was mentioned above, multi-mode fibers do not exhibit the nonlinearity issues to the same degree as single-mode fibers. Although the use of multi-mode fibers for long-haul transmission has been considered and proposed in the past, it was abandoned because multi-mode fibers suffer from modal dispersion caused by the large group delay between different spatial modes. As is known, multi-mode fibers have very large core areas and very large numerical apertures (NA). As a result, multi-mode fibers typically support hundreds of spatial modes. To address the modal dispersion issue, graded-index multi-mode fibers have been designed so that the modes have similar propagation properties. Such fiber designs unfortunately enhance modal coupling. Therefore, even when only a single mode of a multi-mode fiber is excited to transmit data (e.g., "single-mode operation"), modal coupling can still occur. As the other modes couple back to the initially excited mode, modal dispersion occurs.

In view of the above facts, it can be appreciated that, while multi-mode fibers solve the nonlinearity problems associated with single-mode fibers, the problem of mode coupling remains as an impediment in the long distance communications scenario. If mode coupling could be reduced or eliminated, however, advantageous results could be achieved. Indeed, if mode coupling were eliminated, there would not even be a need for modal dispersion compensation.

One way to reduce mode coupling is to ensure that the supported modes of the fiber medium have propagation properties, especially propagation constants, that are as different as possible because, as the difference between the propagation constants of two modes increases, the coupling between these modes dramatically degreases. One way to increase the index difference between different modes is to reduce the number of modes that are supported by the fiber. Therefore, fibers that support multiple, but far fewer, modes than multi-mode fibers in use today, i.e., "few-mode" fibers, are proposed for use as transmission fibers in optical transmission systems, such as long distance communication links.

There are several reasons why mode coupling is reduced when the fiber medium supports fewer modes. First, if few modes are supported, there are fewer possibilities for a given mode to couple to another mode. Second, if there are many modes supported by a fiber, it is more likely that a given mode will have many neighboring modes that are closely spaced to itself in terms of mode propagation constants, which makes it easier for that mode to couple to neighboring modes. Third, fibers that support many modes typically have high numerical aperture (NA). High NA fibers are more likely to induce mode coupling because these fibers typically have higher irregularities on the boundary separating the core and the cladding because, to obtain high NA, the fibers typically have high index difference between their core and cladding. Such a high difference in the indices is typically obtained by heavily doping the glass that is used for either the cladding or the core. It is more difficult to maintain a perfect boundary when high concentrations of dopant are used.

Because few-mode fibers can avoid the problems associated with both nonlinearity and mode coupling, few-mode fibers provide a good compromise between single-mode fibers and multi-mode fibers. In some embodiments, the few-mode fibers can be used in single-mode operation, in which all of the data is carried by only one of the spatial modes, such as the fundamental mode.

As used herein, the term "few-mode optical fiber" or "few-mode fiber" is used to describe a fiber that supports more than one spatial mode but fewer spatial modes than what is commonly referred to as "multi-mode fiber," which typically supports one or more hundreds of modes. In some embodiments, few-mode fiber supports approximately 2 to 50 spatial modes. Because mode coupling tends to increase with the number of supported modes, some preferred few-mode fibers may support only 2 to 10 spatial modes or 2 to 5 spatial modes. In some cases, few-mode fibers support less than 5 spatial modes, for example 2, 3, or 4 spatial modes. The number of modes that a given few-mode fiber supports may, in some cases, depend on the optical and/or electronic dispersion compensation technology used in the transmission system in which the fiber is used.

The number of spatial modes for a step index fiber, N, for a fiber can be mathematically defined as:

$$N = 2n(n+1), \qquad \text{Equation 1}$$

where $n = V/\pi$ and V is the normalized frequency parameter of the fiber given as $V = 2\pi a NA/\lambda$, where a is the core radius, NA is the numerical aperture (where $NA = (n_{core}^2 - n_{clad}^2)^{0.5}$, $n_{core}$ is the refractive index of the core, and $n_{clad}$ is the refractive index of the cladding), and $\lambda$ is the operational wavelength. For few-mode fiber, V is smaller than that for conventional multi-mode fibers, for example, V<20, V<10, or V<5. In some embodiments, the fiber core diameter is kept as large as possible, and NA is kept as low as possible for a given V. Table I provides parameters for example few-mode fibers having V=3.8 and V=12.567, respectively. A V-number larger than 2.405 ensures that the fiber supports more than one spatial mode.

TABLE I

| V | Core Diameter (μm) | NA | $n_2 \div n_1$ |
|---|---|---|---|
| 3.8 | 36.2873 | 0.05 | 1.0006 |
| | 22.6796 | 0.08 | 1.0015 |
| | 18.1437 | 0.1 | 1.0023 |
| 12.567 | 75.055 | 0.08 | 1.0015 |
| | 60.0044 | 0.1 | 1.0023 |

Few-mode fibers can have a construction that is similar to conventional single-mode and multi-mode fibers. Therefore, few-mode fibers can, in some embodiments, comprise a solid core that is surrounded by a solid protective cladding. In most cases, the core of a few-mode fiber is larger than that of a single-mode fiber but smaller than that of a multi-mode fiber. In some embodiments, the core of the few-mode fiber has a diameter of approximately between 10 and 60 μm and the cladding has an outer diameter of approximately 80 to 300 μm.

Figure 1:
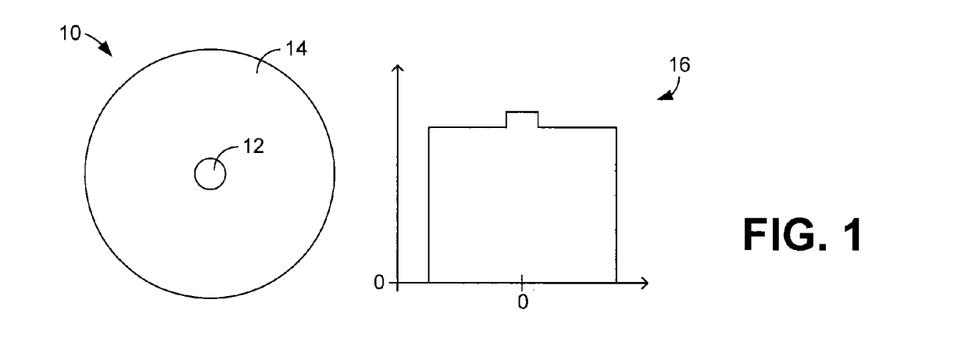
FIG. 1 is a cross-sectional view of a first embodiment of a few-mode fiber and its associated refractive index profile.
Figure 2:
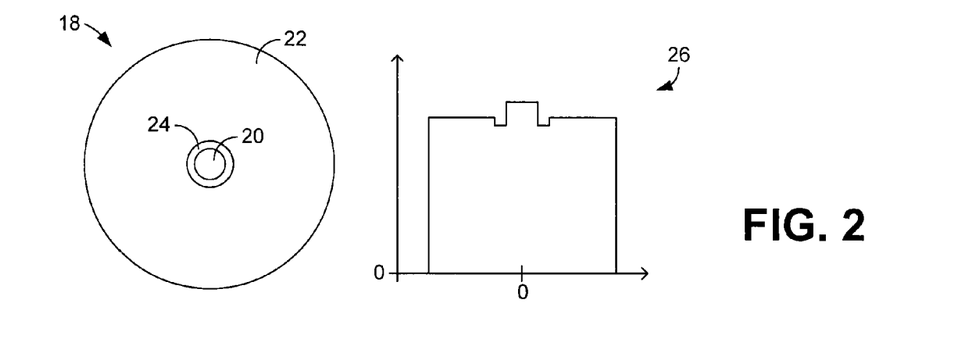
FIG. 2 is a cross-sectional view of a second embodiment of a few-mode fiber and its associated refractive index profile.
Figure 3:
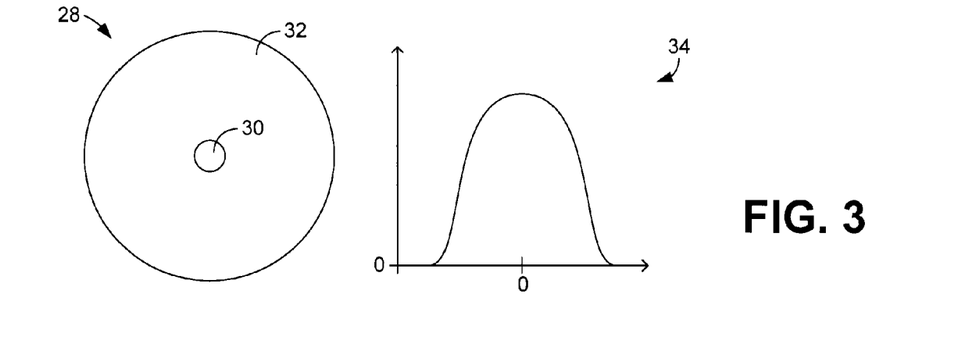
FIG. 3 is a cross-sectional view of a third embodiment of a few-mode fiber and its associated refractive index profile.

Few-mode fibers can be produced to have a variety of refractive index distributions to confine and guide light. FIGS. 1-3 illustrate three examples of few-mode fibers, each having a different refractive index profile. Beginning with FIG. 1, illustrated is a step-index few-mode fiber 10 having a core 12 and a cladding 14. As is shown in the associated refractive index profile graph 16, the core 12 has a uniform refractive index that is higher than the refractive index of the cladding 14, which is also uniform. Turing to FIG. 2, illustrated is a multi-step index few-mode fiber 18 that comprises a core 20, a cladding 22, and an intermediate region 24 between the core and the cladding that has a different refractive index than the core and the cladding. An example refractive index profile is shown in the graph 26. In this example, the intermediate region 24 has an index of refraction that is lower than both the core 20 and the cladding 22 so as to form a W-shaped refractive index profile. With reference next to FIG. 3, illustrated is a graded index few-mode fiber 28 that comprises a core 30 and a cladding 32. As is indicated in the graph 34, both the core 30 and the cladding 32 have indices of refraction that gradually change (decrease) as the radial position increases.

In other embodiments, there may be multiple stages between the core and the cladding. A number of these stages may be step index stages and multiple of them may have graded index profiles.

Figure 4:
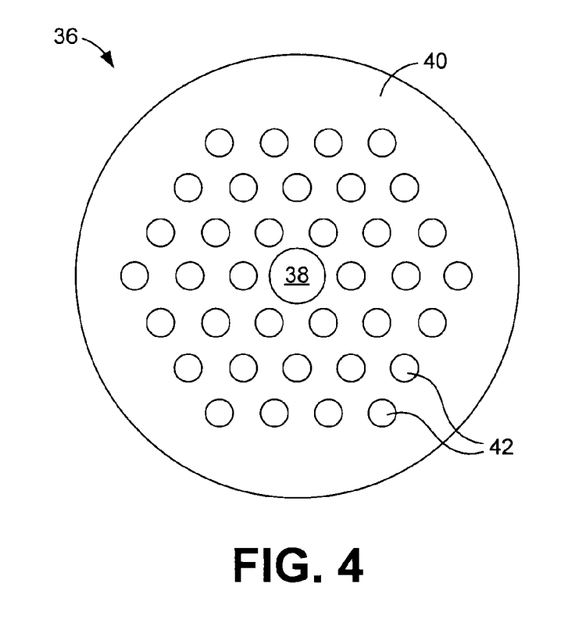
FIG. 4 is a cross-sectional view of a fourth embodiment of a few-mode fiber.

In other embodiments, the few-mode fiber can be formed as a photonic-crystal fiber (PCF). FIG. 4 illustrates an example photonic-crystal fiber 3E. As is shown in that figure, the fiber 36 comprises a core 38, which in this case is a continuous hollow core (i.e., air core) and a cladding 40 that surrounds the core. In embodiments in which the photonic-crystal fiber is an air-core fiber, losses comparable to a single-mode fiber can be achieved. Although the core 38 has been shown as an air core, it is noted that, in alternative embodiments, the core could be formed as a solid core. Provided within the cladding 40 and surrounding the core 38 are a plurality of channels 42 that can be hollow channels or solid channels with indices that are different than their surroundings.

Figure 14:
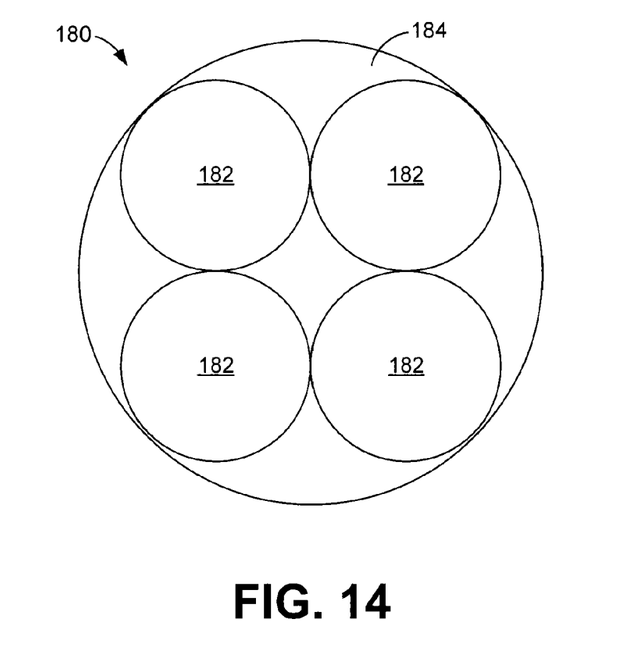
FIG. 14 is a cross-sectional view of a fifth embodiment of a few-mode fiber.

The modes of few-mode fibers can also be supermodes, which result from coupling between conventional modes associated with a single guided-wave structure. The supermodes belong to more than one guided-wave structure. FIG. 14 shows an example few-mode fiber 180 that supports supermodes. In the illustrated embodiment, the fiber 180 comprises four conventional single-mode fibers 182. In some embodiments, each single-mode 182 fiber is identical and is supported by a cladding material 184. When the single-mode fibers 182 are brought close together, the modes of the fibers interact with each other creating supermodes. The complex amplitude $A_j$ of each fiber mode is coupled according to the following couple-mode equation:

$$-j\beta_m \begin{pmatrix} A_1 \\ A_2 \\ A_3 \\ A_4 \end{pmatrix} = -j \begin{pmatrix} \beta_0 & c_1 & c_2 & c_1 \\ c_1 & \beta_0 & c_1 & c_2 \\ c_2 & c_1 & \beta_0 & c_1 \\ c_1 & c_2 & c_1 & \beta_0 \end{pmatrix} \begin{pmatrix} A_1 \\ A_2 \\ A_3 \\ A_4 \end{pmatrix}, \quad \text{Equation 2}$$

where $\beta_0$ is the propagation constant of the mode of each isolated fiber, $c_1$ is the coupling coefficient between adjacent fibers and $c_2$ is the coupling coefficient between non-adjacent fibers. The supermodes, which are the eigenmodes of the above matrix equation, have the following propagation constants:

$\beta_{(1)} = \beta_0 + 2c_1 + c_2$; (fundamental)

$\beta_{(2)} = \beta_0 - c_2$;

$\beta_{(3)} = \beta_0 - c_2$;

$\beta_{(4)} = \beta_0 - 2c_1 + c_2$.

Under the weak coupling condition, the number of modes will be the same as the number of single-mode fibers. As can be seen from above, the propagation constants of the supermodes can be tuned by varying the coupling constants. To the first-order of approximation, one can assume that $c_1 \gg c_2$. Therefore, the propagation constant of the fundamental supermode will differ from that the next supermode (which degenerates having the same propagation constants) by $2c_1$. The difference between the propagation constants of the supermode therefore can be designed to be large enough so that the supermodes no longer couple to each other.

It should be noted that the two degenerate supermodes will couple to each other. However, since the degenerate supermodes have the same propagation constant, they can carry independent information and be demultiplexed at the receiver. Demultiplexing of the two degenerate supermodes can be performed using either training symbols or blind source separate techniques using a constant modulus algorithm or an independent-component analysis algorithm.

Since mode coupling only occurs for modes with nearly the same propagation constant, the four single-mode fibers 182 in FIG. 14 can be replaced by multi-mode fibers so long as they support nearly identical modes. For example, if each fiber has two modes, then the fundamental modes of the four fibers will create four supermodes and the high-order modes of the four fibers will create another four supermodes. These supermodes can be designed to have propagation constants different enough to ensure low mode coupling.

Irrespective of the particular configuration of the few-mode fiber, it should be produced with the high quality standards that are used when long distance fibers are made to ensure low mode coupling. In contrast, current multi-mode fibers that are produced for short distance applications are not produced with such high quality standards.

In addition to decreasing the core diameter, mode coupling can be reduced by reducing microbending. It has been suggested that one of the sources of random mode coupling is the microbending caused by imperfections on the surfaces in contact with the fiber surface, particularly after cabling. Therefore, increasing the cladding diameter and, therefore the overall fiber diameter, from the typical value of 125 microns (μm) to 150 μm or 250 μm would make the fiber more resistant to such microbends. Increasing the fiber diameter also has the advantage of reducing the fluctuations in the core size and location, which in turn reduce random mode coupling. As is known, abrupt changes in the core diameter or location can cause coupling between the modes that are supported by multi-mode fibers. It is noted that single-mode components, such as optical routers that are used to create networks of communication links, can be inserted between the mode profile adjusters 80.

In current fiber manufacture, changes in the core size are minimized during the drawing process with feedback mechanisms that control the outer diameter (cladding diameter) of the drawn fiber at a very high speed. Since the feedback does not originate directly from the core size but from the fiber diameter, the sensitivity is relative. For instance, if the diameter of a 125 μm fiber is controlled up to 5 μm accuracy, that means the diameter of the 12.5 μm core is controlled up to 0.5 μm accuracy. Therefore, increasing the cladding diameter for a given core diameter reduces the amount of fluctuation in the core diameter. To minimize the fluctuations in the core diameter, the core shape, and the location of the core, it may be better to monitor the core directly rather than indirectly through the cladding. An additional advantage of using thicker cladding diameters is that, when larger core diameters, such as 30 μm or 50 μm, are used there is less cladding left to confine the mode in the fiber. Therefore, when a large core diameter and low NA fibers are used to make few-mode fibers, it may be desirable to have thick claddings to reduce bending losses and achieve high confinement.

Figure 5:
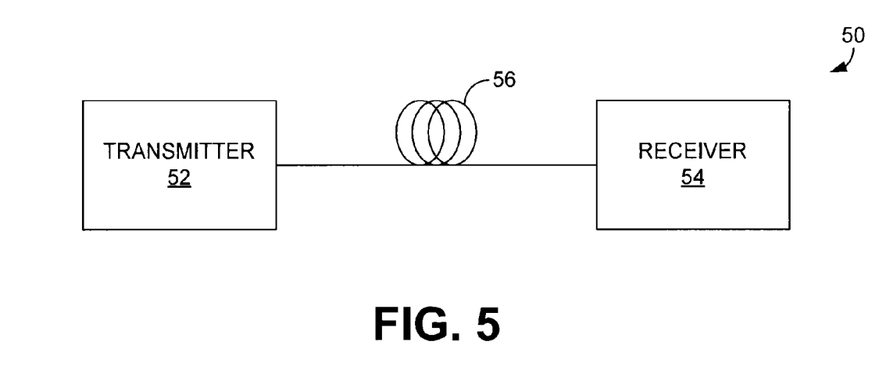
FIG. 5 is a block diagram of a first embodiment of an optical transmission system.

Optical transmission systems in accordance with this disclosure comprise at least one few-mode fiber, as defined above. FIG. 5 illustrates a simple optical transmission system 50 that comprises a transmitter 52, a receiver 54, and a length of few-mode fiber 56. The transmitter 52 can comprise any transmitter that can transmit optical signals, for example using a WDM scheme, along the fiber 56 and the receiver 54 can comprise any receiver that can receive those transmitted signals. By way of example, the transmitter 52 comprises a laser with an external modulator and the receiver 54 at least comprises a photodetector. As described above, the transmitter 50 can be used to excite a single mode of the few-mode fiber 56, such as the fundamental mode.

Figure 6:
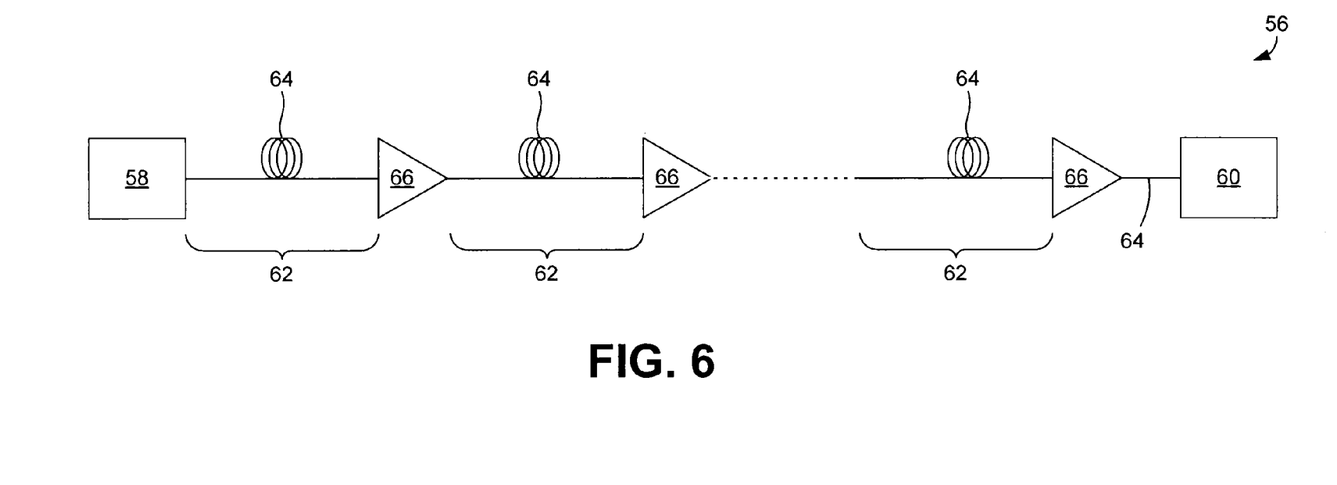
FIG. 6 is a block diagram of a second embodiment of an optical transmission system.

FIG. 6 illustrates a further optical transmission system 56, which can be used as a long distance communication link. As is shown in FIG. 6, the system 56 comprises a transmitter 58 and a receiver 60. In addition, the system 56 comprises multiple spans 62, each comprising a length of few-mode fiber 64. By way of example, each span 62 can be approximately 40 to 50 km in length for undersea applications and 80 to 100 km in length for terrestrial applications. The overall length of the communication link is potentially infinite but in many cases will extend across thousands of kilometers Separating each span 62 along the length of the communication link between the transmitter 58 and the receiver 60 are optical amplifiers 66 that amplify the optical signals carried by the few-mode fibers 64. By way of example, the amplifiers 66 selectively accept only the fundamental mode. Although the system 56 has been described and illustrated as comprising an amplifier 66 at the end of each span 62, it is noted that other components, such as repeaters, could be used instead. In the embodiment of FIG. 6, each optical component of the system 56, including the transmitter 58, the receiver 60, and the amplifiers 66, supports the same mode profile as the few-mode fiber 64. Multiple communication links such as that illustrated in FIG. 6 can be connected in such a way to form networks.

Figure 7:
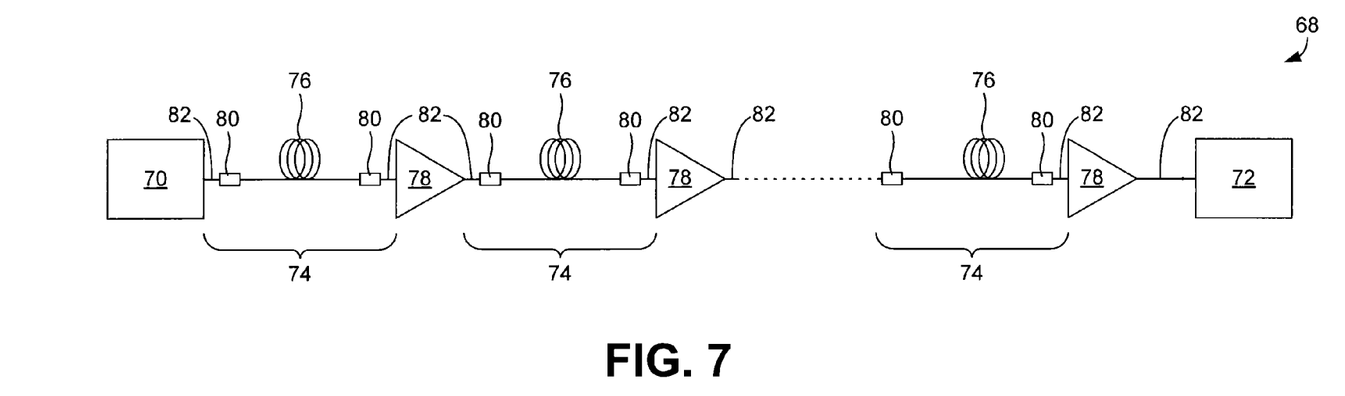
FIG. 7 is a block diagram of a third embodiment of an optical transmission system.

FIG. 7 illustrates an optical transmission system 68 that can also be used for long distance communications. The system 68 also comprises a transmitter 70, a receiver 72, and multiple spans 74, each comprising a length of few-mode fiber 76. Separating each span 74 is an optical amplifier 78 that amplifies the optical signals carried by the few-mode fibers 76. In this embodiment, however, each optical component of the system 68, including the transmitter 70, the receiver 72, and the amplifiers 78, supports the mode profile of single-mode fiber. To account for this difference and to eliminate or reduce coupling loss, the system 68 comprises mode profile adjusters 80 that provide low loss coupling between the excited mode (e.g., fundamental mode) of the few-mode fiber 76 and the optical components. Extending between each mode profile adjuster 80 and its associated optical component is a length of single-mode fiber 82. The system 68 has the advantage of being able to utilize the optical components that are currently used in existing long-haul communication links, which are adapted for single-mode fiber. It is noted that other single-mode components, such as optical routers that are used to create networks of communication links, can be inserted between the mode profile adjusters 80.

Figure 8:
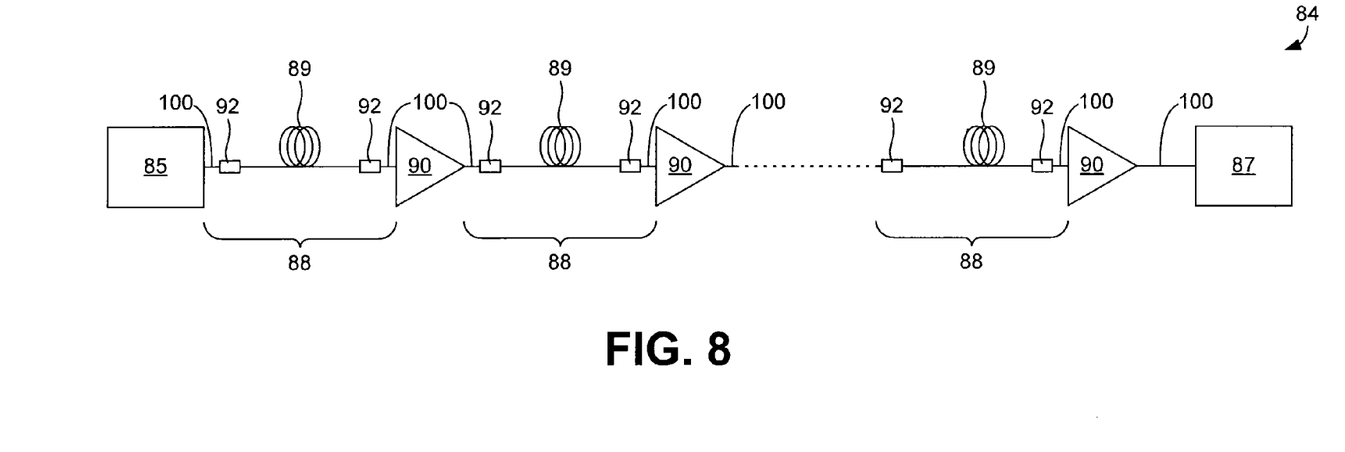
FIG. 8 is a block diagram of a fourth embodiment of an optical transmission system.

FIG. 8 illustrates a further optical transmission system 84 that can be used for long distance communications. The system 84 also comprises a transmitter 85, a receiver 87, and multiple spans 88, each comprising a length of few-mode fiber 89. Separating each span 88 is an optical amplifier 90 that amplifies the optical signals carried by the few-mode fibers 89. In this embodiment, however, it is assumed that the high order mode of the few-mode fibers 89, and not the fundamental mode, is used. To account for this, the system 84 includes mode converters 92 that convert the high order mode used for transmission into the fundamental mode, which is supported by the optical components of the system. Single-mode fiber 100 extends between each mode converter 92 and its adjacent optical component. In some embodiments, the transmission fibers can be single-mode and the optical components operate at higher modes.

Figure 9:
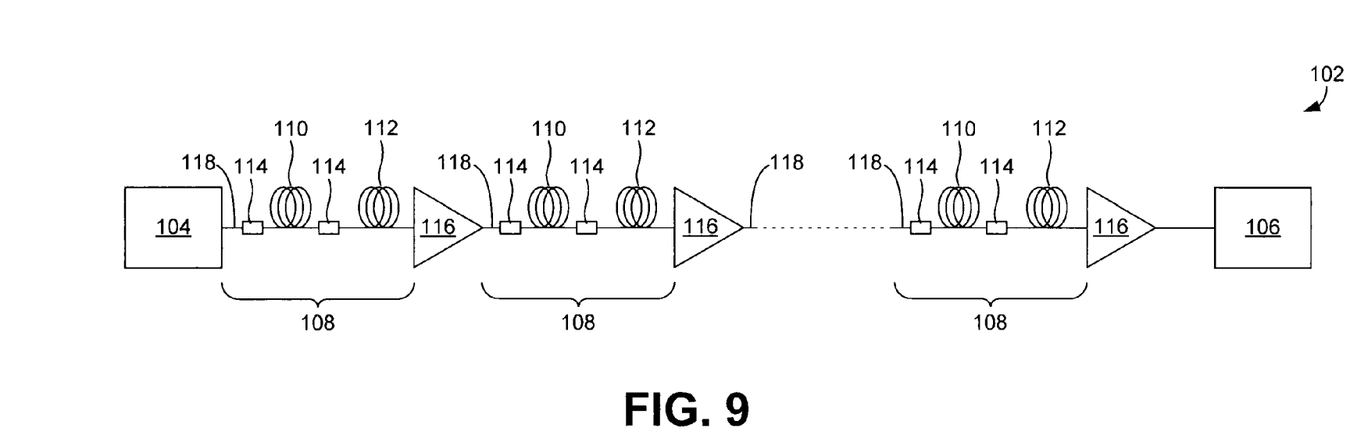
FIG. 9 is a block diagram of a fifth embodiment of an optical transmission system.

FIG. 9 illustrates yet another optical transmission system 102 that can be used for long distance communications. The system 102 also comprises a transmitter 104, a receiver 106, and multiple spans 108. In this embodiment, however, each span 108 comprises a length of few-mode fiber 110 and a length of single-mode fiber 112. In such a case, the few-mode fiber 110 is used where the power of the optical signal is greatest and where nonlinearity tends to be most problematic. After the power recedes, single-mode fiber 112 can be used because it may have lower loss or may avoid modal dispersion that can still occur due to various factors, such as imperfections in the few-mode fibers. In some embodiments, the length of the few-mode fiber 110 is selected to be just greater than the length along which most of the nonlinear effects would occur with a single-mode fiber. As with the embodiment of FIG. 7, mode profile adjusters 114 can be used to adjust the mode profile from few-mode to single-mode operation. Separating each span 108 is an optical amplifier 116 that amplifies the optical signals carried along the span. Further single-mode fiber 118 can be used between the optical components and the few-mode fibers 110.

Which one of the above-described systems would be best can depend on various factors, including the mode coupling length of the few-mode fiber. Mode coupling length can be defined as the length scale at which ten percent of the power of the spatial mode that suffers the largest mode coupling leaks to other modes supported by the fiber. If the mode coupling length is, for instance, longer than one span length, it may be possible to excite only one mode of the few-mode fiber and the rest of the components in the transmission fiber can be single-mode. If the mode coupling length is shorter than span length, it might be advisable to place a few-mode fiber shorter than the mode coupling length in the transmission link where the signal power is expected to be high, and use single-mode fiber for the rest of the span.

In general, the greater the number of modes supported by a few-mode fiber, the less significant the nonlinear impairments. To balance the nonlinear impairments and the excess loss, it may be desirable in some embodiments to place few-mode fibers that support a large number of modes where the optical power is high, and few-mode fibers that support a lower number of modes where the power is lower. This can be achieved, for instance, by splicing or connecting different few-mode fibers in which case the changes in the number of supported modes is relatively abrupt. In other cases, the parameters of the few-mode fiber can gradually change over its length so that the number of modes supported by the few-mode fiber changes gradually along its length. In the simplest case, this can be achieved by keeping the fiber index profile fixed, but changing the core diameter or fiber NA gradually along its length. As an example of changing diameter, the core of a two-mode fiber can, for instance, begin at approximately 10 to 60 µm and linearly decrease to approximately 8 to 12 µm over the course of approximately 2 to 100 km. Fibers having greater than two modes can also be tapered in a similar manner.

As mentioned above, it may be preferable to only excite a single mode, e.g. the fundamental mode, of the few-mode fibers used in a communication link. In some embodiments, however, multiple modes could be excited to provide for mode multiplexing. For example, either all or a subset of the supported modes can be excited. Since low coupling means that different modes do not significantly affect one another, each excited spatial mode of a few-mode fiber could carry different information content. In such a case, demultiplexing can be accomplished using coherent detection based on the fact that the spatial modes are orthogonal. In the special case of two modes, the local oscillator from the fiber can be split into two: one with the two modes in phase and the other with the two modes out of phase. The resulting coherently-detected signal thus contains the sum and difference of the fields of the two modes, respectively. Each of the fields can then be obtained by simple algebraic manipulations. In some cases, it may be desirable to excite more than one spatial mode but each spatial mode can carry the same information content. At the receiver, each spatial mode contributes to increasing the signal-to-noise ratio.

Although mode multiplexing can be performed, measures may need to be taken in such cases to compensate for mode coupling. Generally speaking, the resources required to compensate for mode coupling depend not only on fiber parameters and the number of modes that are supported but also on how many of the supported modes are excited at the transmitter. In general, the greater the number of modes that are excited, the more difficult it becomes to compensate impairments caused by multiple mode transmission.

When multiple modes are excited, or potentially even when only one mode is excited, it can be possible for some power from the excited mode(s) to leak into unwanted modes due to fiber defects or other factors. In such cases, the power coupled to the unwanted modes can be purged to mitigate the impairment that such coupling could have. If the unwanted modes are frequently purged, power in the unwanted modes can be prevented from coupling back to the mode that was selected for transmission. Purging unwanted modes can be achieved in some cases simply by inserting sections of fiber into the transmission system that only support the excited modes of the few-mode fiber. Alternatively, mode purging can be achieved by adiabatically transforming the fiber to a fiber that supports only the transmission mode. In other embodiments, mode purging can be achieved by placing into the transmission system elements that have large losses for the unwanted mode but low loss for the mode used for transmission. In yet another embodiment, elements can be added to the transmission system to remove power from the unwanted modes, as in the embodiment of FIG. 10.

Figure 10:
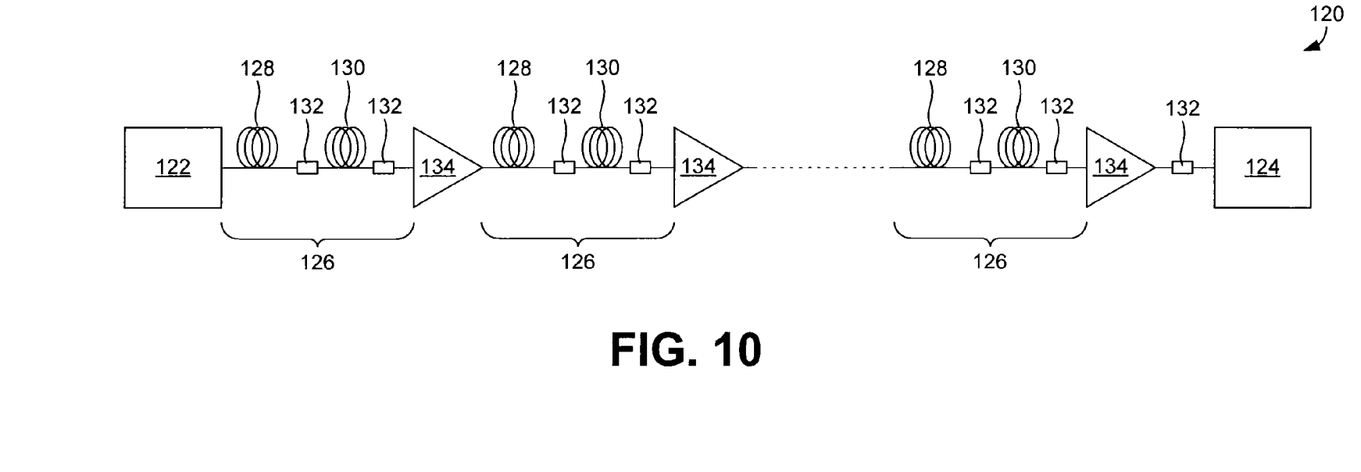
FIG. 10 is a block diagram of a sixth embodiment of an optical transmission system.

FIG. 10 illustrates a further optical transmission system 120 that can be used for long distance communications that provides for mode purging. The system 120 also comprises a transmitter 122, a receiver 124, and multiple spans 126. In this embodiment, each span 126 comprises a first length of few-mode fiber 128 and a second length of few-mode fiber 130. At the end of each length of fiber 128, 130 is provided a mode purger 132 that couples the unwanted modes to cladding modes to remove them from the fiber core. In some embodiments, the mode purgers 132 comprise fiber gratings. Separating each span 126 is an optical amplifier 134 that amplifies the optical signals carried along the span. Although mode purging has been described as being performed at the end of each length of fiber, in other embodiments purging can be performed at the end of each span. In some embodiments, the unwanted modes can be purged more than two times per span.

Figure 11:
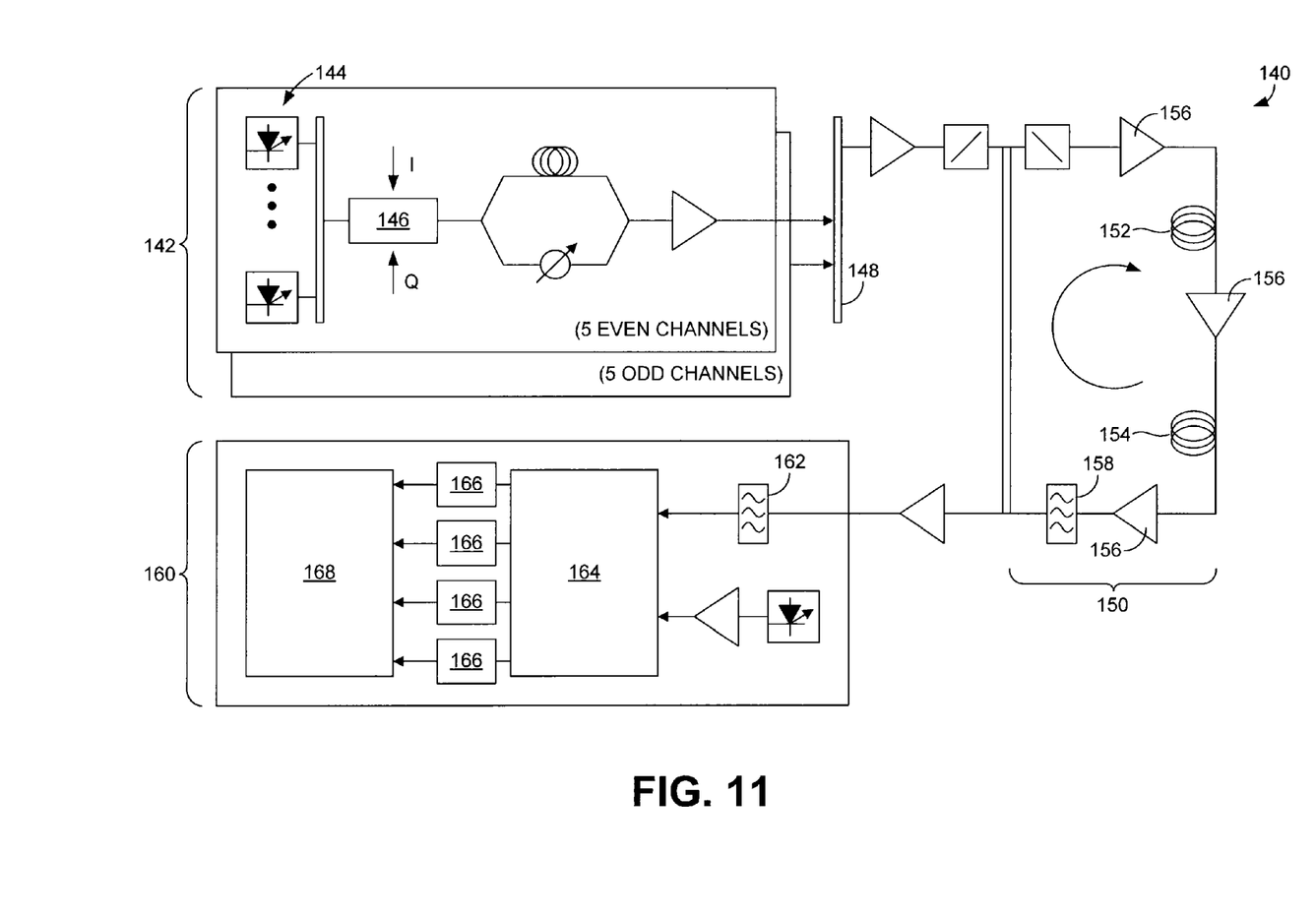
FIG. 11 is a block diagram of an experimental system that was used to test the feasibility of few-mode fibers in optical transmission.

FIG. 11 shows an experimental system 140 that was constructed to test the viability of few-mode fibers for long distance communications. The system 140 was used to transmit ten polarization division multiplexed WDM channels at 28 gigabaud (Gbaud) with quadrature phase-shift keying (QPSK) modulation. The total bit rate per wavelength was 112 gigabits/second (Gb/s). In the transmitter 142, ten distributed feedback (DFB) lasers 144 with a channel spacing of 50 GHz were separated into five even and odd channels. The even and odd channels were modulated individually at 28 Gbaud with an I/Q modulator 146. Both the even and odd channels were polarization multiplexed by separating the same signal into two orthogonal polarizations, delaying one arm, and recombining them. The data in the I and Q channels and the two polarizations were obtained by delaying the same data pattern, which was obtained by multiplexing four 7 Gb/s tributaries, each of which carried a psuedorandom binary sequence (PRBS). The odd and even channels were combined with a 50 GHz interleaver 148 at the output of the transmitter 142.

The system 140 further comprised a loop 150 that included two spans of few-mode fiber, a first span 152 having a length of 76 km and a second span 154 having a length of 72 km. The few-mode fiber in both spans 152, 154 supported two modes. The first span 152 was obtained by splicing two spools of few-mode fiber having lengths of 39 km and 37 km. The second span 154 was obtained by splicing two spools of few-mode fibers havings lengths 50 km and 22 km. Each spool was wound on a standard size reel with a 25 centimeter (cm) flange diameter. The loss coefficient, dispersion, and effective area of the fibers were 0.2 dB/km, 20 ps/km/nm, and 130 $\mu m^2$.

Each end of the spans 152, 154 was spliced directly to a standard single-mode fiber using fusion splicers in the standard mode, which is used to splice standard single-mode fibers. The splice loss was measured using bidirectional optical time-domain reflectometer (OTDR) and was found to be approximately 0.2 dB per splice. The loss was measured after the two spans 152, 154 were spliced at both ends. The losses for the first and second spans 152 and 154 were found to be 15.7 dB and 15 dB, respectively, including the splice and connector losses. Therefore, any excess loss that may have resulted from mode coupling was insignificant. Moreover, the measured fiber losses were stable over time and no fluctuation in the output power was observed. Two single-stage erbium doped fiber amplifiers (EDFAs) 156 were used to compensate the span losses and another EDFA 156 was used to compensate the loop's control losses. A wavelength selective switch (WSS) 158 was inserted in the loop 150 to equalize the EDFA gain and to remove the amplified spontaneous emission (ASE) noise outside of the WDM channels.

A coherent polarization diversity receiver 160 was used to receive the signal. The signal channel to be received was filtered by a second WSS 162 and was mixed with a local oscillator at a polarization diversity balanced hybrid 164. The output of balanced photodiodes 166 was collected with a real-time oscilloscope 168 with a 16 GHz analog bandwidth at 40 Gsa/s. The received data was processed off line to estimate the Q value of the received signal. The offline processing comprised digital dispersion compensation, frequency offset estimation, phase noise estimation, and fifteen tap time-domain equalization based on a constant-modulus algorithm that adaptively removes the polarization rotation and compensates for polarization-mode dispersion and any residual dispersion. In the post processing, no attempt was made to compensate or mitigate any impairment that may result from differential mode delay (DMD).

Figure 12:
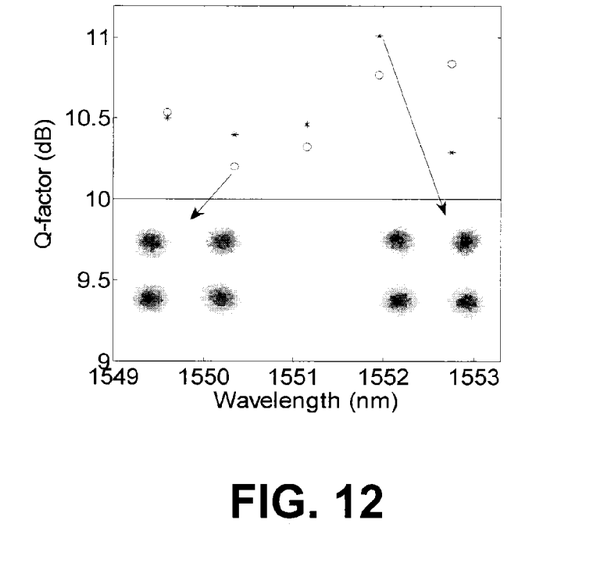
FIG. 12 is a graph that plots measured Q-factor resulting from testing using the system of FIG. 11.

FIG. 12 shows the Q values of the even channels measured after 34 loops corresponding to 5,032 km after averaging over four million received bits. The Q values of all channels for both polarizations remained above 10 dB. The constellation diagrams for two points are shown in the inset, which are obtained from 50,000 symbols. It is clear that, in the presence of DMD, it would not be possible to transmit channels at 28 Gbaud/s over 5,000 km. Therefore it is safe to conclude that mode coupling was not present in the few-mode fiber.

Figure 13:
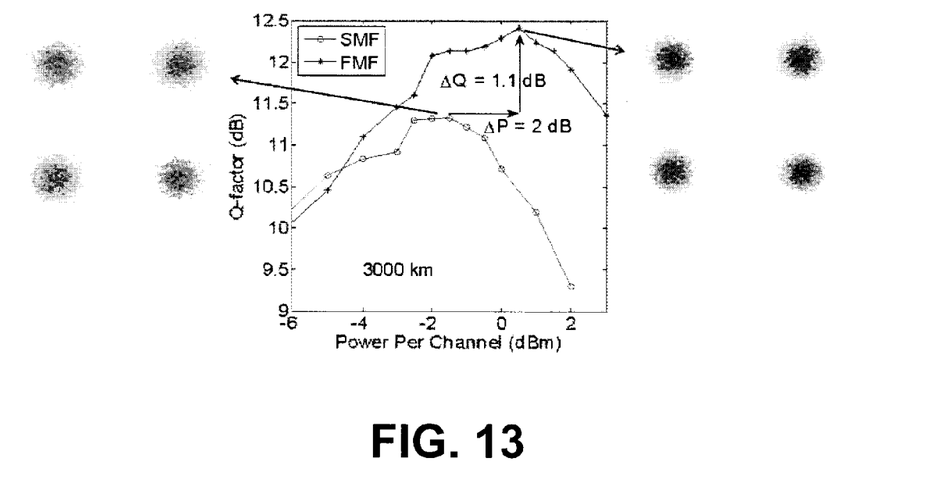
FIG. 13 is a graph that compares the Q-factor of single-mode fiber and few-mode fiber obtained during testing.

It is important that few-mode fibers induce not only smaller nonlinear impairments due to the larger core area but also no additional impairments due to DMD. To verify this, the transmission experiment was repeated by replacing the two few-mode fiber spans by single-mode fiber spans of 80 km length each. The fibers had a loss coefficient, a dispersion parameter, and an effective area of 0.2 dB/km, 17 ps/km·nm, and 80 $\mu m^2$. To compare the nonlinearity performance of the two cases, the received Q value was plotted as a function of launch power after 3,100 km in the case of the few-mode fibers (21 loops) and after 3,040 km in the case of single-mode fibers (19 loops). The comparison was made at 3,000 km so that the Q value remained above 10 dB even when single-mode fibers were used. The results are shown in FIG. 13 in which the plotted lines show the average of the Q values in both polarizations in the central channel for the single-mode fiber and few-mode fiber transmission. At low powers, both cases are limited by OSNR and perform similarly since the loop loss for both cases is similar. As the launch power was increased, however, nonlinear impairments became the dominant source of degradation. Since few-mode fibers had 1.6 times larger effective area, the optimum operating power for the few-mode fibers was approximately 1.6 times larger compared to single-mode fibers. As a consequence, the maximum Q value achievable at this distance was 1.1 dB larger in the case of the few-mode fibers.

Even though the tolerance of the single-mode operation was not rigorously tested by inducing varying degrees of mechanical stress to the fibers, it was found that no special handling was necessary to maintain single-mode operation. The few-mode fiber spans were spooled on standard diameter spools with 25 cm wide flanges, which shows that the fundamental mode was well contained in the fiber core and did not suffer from excess macro- or micro-bending loss, which is expected to be large for a spool with moderate tension. Moreover, no deterioration in the performance was observed after the experiment was left to run over the course of several days, except for compensating for the drift in the bias points of the I-Q modulators in the transmitter.

We claim:

1. A long distance optical communication link comprising:
   an optical transmitter that transmits optical communications signals;
   an optical receiver that receives optical communications signals; and
   multiple spans of optical fiber that extend between the transmitter and the receiver, each span comprising a length of a few-mode fiber, wherein the few mode fiber is selected from 49 few mode fibers that respectively support a fixed number of at least 2 but no more than 50 spatial modes at an operational wavelength of the long distance optical communication link, one of the modes being a fundamental mode;
   wherein the long distance link is configured to only transmit the optical communications signals along the fundamental mode of the few-mode fibers.

2. The long distance optical communication link of claim 1, wherein the few-mode fiber supports the fixed number of modes consisting of 2 to 10 spatial modes.

3. The long distance optical communication link of claim 1, wherein the few-mode fiber supports the fixed number of modes consisting of 2 to 5 spatial modes.

4. The link of claim 1, wherein the few-mode fiber supports 2, 3, or 4 spatial modes.

5. The link of claim 1, wherein the few-mode fiber has a core with a diameter between 10 and 60 microns ($\mu m$).

6. The link of claim 1, further comprising a mode profile adjuster that adjusts a profile of a signal within the fundamental mode of the few-mode fiber to provide low loss coupling between the fundamental mode and an optical component of the link.

7. The link of claim 1, wherein each span further comprises a length of single-mode fiber that is optically connected to the length of few-mode fiber, the single-mode fiber being downstream of the few-mode fiber.

8. The link of claim 1, wherein each span comprises two lengths of the few-mode fiber, a first length supporting a first number of spatial modes and a second length supporting a smaller number of spatial modes that is downstream of the first length of the few-mode fiber.

9. The link of claim 1, wherein each span further comprises a mode purger that removes power from spatial modes of the few-mode fiber that were not intended to be used to transmit data.

10. The link of claim 1, wherein each span extends across tens of kilometers and the entire link extends across thousands of kilometers.

11. The link of claim 1, further comprising an optical amplifier positioned at an end of each span.

12. A method for transmitting an optical communications signal across a long distance optical communication link of a transmission system, the method comprising:
   providing a long distance optical communication link comprising:
      an optical transmitter that transmits the optical communications signals;
      an optical receiver that receives the optical communications signals; and
      multiple spans of optical fiber that extend between the transmitter and the receiver, each span comprising a length of few-mode fiber, wherein the few mode fiber is selected from 49 few mode fibers that respectively supports a fixed number of at least 2 but no more than 50 spatial modes at an operational wavelength of the long distance optical communication link, one of the modes being a fundamental mode; and
   transmitting a communications signal only across a fundamental mode of the few mode fiber over the long distance optical communication link by exciting only the fundamental mode of the few-mode fiber.

13. The method of claim 12, wherein the few-mode fiber supports the fixed number of at least 2 but no more than 10 spatial modes.

14. The method of claim 12, wherein the few-mode fiber supports the fixed number of at least 2 but no more than 5 spatial modes.

15. The method of claim 12, wherein the few-mode fiber supports 2, 3, or 4 spatial modes.

16. The method of claim 12, wherein the few-mode fiber has a core with a diameter between 10 and 60 microns ($\mu m$).

17. The method of claim 12, further comprising providing multiple spans within the transmission system wherein each span comprises a length of the few-mode fiber.

18. The method of claim 17, wherein each span comprises a length of single-mode fiber that is optically connected to the length of the few-mode fiber, the single-mode fiber being downstream of the few-mode fiber.

19. The method of claim 17, wherein each span comprises two lengths of the few-mode fiber, a first length supporting a first number of spatial modes and a second length supporting a smaller number of spatial modes that is downstream of the first length of the few-mode fiber.

20. The method of claim 17, further comprising providing an optical amplifier positioned at an end of each span.

* * * * *